(12) United States Patent
Takaki

(10) Patent No.: US 7,464,220 B2
(45) Date of Patent: Dec. 9, 2008

(54) STORAGE APPARATUS AND METHOD OF CONTROLLNG THE SAME

(75) Inventor: Toshiaki Takaki, Tokyo (JP)

(73) Assignee: NEC Corporation, Tokyo (JP)

( * ) Notice: Subject to any disclaimer, the term of this patent is extended or adjusted under 35 U.S.C. 154(b) by 269 days.

(21) Appl. No.: 11/384,336

(22) Filed: Mar. 21, 2006

(65) Prior Publication Data
US 2006/0221393 A1 Oct. 5, 2006

(30) Foreign Application Priority Data
Mar. 29, 2005 (JP) ............................. 2005-094031

(51) Int. Cl.
- G06F 12/00 (2006.01)
- G06F 13/00 (2006.01)
- G06F 11/00 (2006.01)

(52) U.S. Cl. .................... 711/112; 711/162; 711/165; 714/6

(58) Field of Classification Search ................ None
See application file for complete search history.

(56) References Cited

U.S. PATENT DOCUMENTS
2005/0097208 A1 * 5/2005 Chu et al. ................. 709/224

FOREIGN PATENT DOCUMENTS

| JP | 5-225074 | 9/1993 |
|---|---|---|
| JP | 6-222988 | 8/1994 |
| JP | 2000-278286 | 10/2000 |
| JP | 2001-34535 | 2/2001 |
| JP | 2003-162439 | 6/2003 |
| JP | 2004-213435 | 7/2004 |

* cited by examiner

Primary Examiner—Reginald G Bragdon
Assistant Examiner—Eric S Cardwell
(74) Attorney, Agent, or Firm—McGinn IP Law Group, PLLC

(57) ABSTRACT

A storage apparatus comprising a plurality of nodes through which write-data received from a host is written into a disc, each of the nodes including a first memory in which the write-data is temporarily stored, a second memory, a copier which copies both write-data stored in the first memory and write-data stored in a first memory of another node into the second memory, the copier being able to make communication with a copier of the another node through a copier-interface, and a mode-switch which, when a trouble is found in the copier-interface, writes the write-data stored in the first memory into the disc without copying the write-data into the second memory.

25 Claims, 9 Drawing Sheets

STORAGE APPARATUS AND METHOD OF CONTROLLNG THE SAME

BACKGROUND OF THE INVENTION

1. Field of the Invention

The invention relates to a storage apparatus, a method of controlling the same, and a program for causing a computer to carry out the method. More particularly, the invention relates to a storage apparatus such as a network attached storage (NAS) apparatus, including a plurality of nodes each including first and second memories in order to store data stored in the first memory into the second memory as backup data, a method of controlling a network attached storage apparatus, and a program for causing a computer to carry out the method.

2. Description of the Related

For instance, Japanese Patent Application Publication No. 2004-213435 has suggested a NAS system including a plurality of NAS nodes, a cache memory commonly used by the NAS nodes, and a battery for supplying electrical power to the cache memory. Read/write data transmitted from a client apparatus to each of the NAS nodes is temporarily stored in the cache memory, and then, written into a disc. In the suggested NAS system, the cache memory is backed up by a battery to ensure that data stored in the cache memory is protected even when any one of the NAS nodes is troubled.

However, the suggested NAS system is accompanied with a problem that the NAS system has to include a cache memory having a large capacity and operating at a high speed, resulting in high costs. Hence, the suggested NAS system can be used only in a high-end apparatus.

Japanese Patent Application Publication No. 2001-34535 has suggested a cache memory backup system in which when data is written into a cache memory, the same data is written further into a non-volatile memory, taking precaution against that a power supply is turned off while data is being written into the cache memory.

Japanese Patent Application Publication No. 5-225074 (published September 1993) has suggested a memory system including first and second modules each including a cache memory, a non-volatile memory, and a power source. Amended block of data is written into both a cache memory of the first module and a non-volatile memory of the second module, ensuring that data is protected even if a power source of one of the first and second modules is troubled.

When the memory system suggested in Japanese Patent Application Publication No. 5-225074 is applied to a NAS apparatus, each of nodes is designed to include a cache memory, a non-volatile memory, a copier for copying data stored in a cache memory in a first node into a non-volatile memory in a second node, and a copier-interface through which data stored in a cache memory in first and second nodes are transmitted to each other. For instance, if the copier-interface is troubled, it would be impossible to identify which copier is troubled among the copiers in the first and second nodes.

In such a case, for instance, the first node is ceased to operate, and the second node takes over tasks to be carried out by the first node, that is, the second node fails over the first node. Then, a copier of the first node is exchanged into a new one, and thereafter, the first node restarts.

However, if a copier of the second node is actually in trouble, there occurs a copier-interface trouble again, even if a copier of the first node is exchanged into a new one, and then, the first node restarts, resulting in that the first node is ceased to operate again. It is necessary to completely cease operation of the NAS apparatus, and exchange a copier of the second node into a new one.

Japanese Patent Application Publication No. 6-222988 (published August 1994) has suggested a memory controller including a first cluster device through which data is transmitted to a memory from a host computer, a second cluster device through which data is transmitted to a memory from a host computer, a first cache memory electrically connected to the first cluster device, a second cache memory electrically connected to the second cluster device, a first non-volatile memory electrically connected to the second cluster device, a second non-volatile memory electrically connected to the first cluster device, a first unit which stores data into the first cache memory, and stores the data into the first non-volatile memory as backup data, and a second unit which reads the data out of the first non-volatile memory when the first cache memory is troubled.

Japanese Patent Application Publication No. 2000-278286 has suggested a network system including two networks independent of each other, and a plurality of nodes each making communication with the networks. Each of the nodes includes a monitoring device which monitors whether a predetermined node is making communication with the networks, a channel administrator which administrates channels through which communication is made among the nodes, and a selector which selects one of the networks for communication among the nodes.

Japanese Patent Application Publication No. 2003-162439 has suggested a storage system including a plurality of interfaces, a plurality of discs accessible from the interfaces, and a common memory accessible from the interfaces. Each of the interfaces includes a block interface dealing with an I/O request per a disc block and/or a file interface having a file server dealing with an I/O request per a file. A file system commonly accessible from a plurality of file servers is constructed in a part of the discs. The common memory has a first area in which a changing log of the file system is stored, and a second area in which data relating to an administration file server is stored.

SUMMARY OF THE INVENTION

In view of the above-mentioned problem in the prior art, it is an object of the present invention to provide a storage apparatus such as a network attached storage apparatus, which is capable of, even if a copier-interface is troubled, exchanging a copier without stopping operation of the storage apparatus.

It is further an object of the present invention to provide a method of controlling a storage apparatus such as a network attached storage apparatus, which is capable of doing the same.

It is further an object of the present invention to provide a program for causing a computer to carry out the above-mentioned method.

In one aspect of the present invention, there is provided a storage apparatus including a plurality of nodes through which write-data received from a host is written into a disc, each of the nodes including a first memory in which the write-data is temporarily stored, a second memory, a copier which copies both write-data stored in the first memory and write-data stored in a first memory of another node into the second memory, the copier being able to make communication with a copier of the another node through a copier-interface, and a mode-switch which, when a trouble is found in the copier-interface, writes the write-data stored in the first memory into the disc without copying the write-data into the second memory.

It is preferable that each of the nodes further includes a write-back device which, when the mode-switch switches a mode into another mode, writes the write-data stored in the second memory into the disc.

It is preferable that each of the nodes further includes a diagnosis device which diagnoses the copier when the node restarts after the copier was exchanged into a new one.

It is preferable that each of the nodes further includes a fail-over controller which, when another node stop operation thereof, takes over tasks to be carried out by the another node.

It is preferable that each of the nodes further includes a communicator which makes communication with another node when the copier-interface is troubled.

For instance, the first memory may comprise a cache memory.

For instance, the second memory may comprise a non-volatile memory.

For instance, a number of the nodes is two.

There is further provided a storage apparatus including a plurality of nodes through which write-data received from a host is written into a disc, each of the nodes including a first memory in which the write-data is temporarily stored, a second memory as a backup memory for storing the write-data, a copier which copies both write-data stored in the first memory and write-data stored in a first memory of another node into the second memory, the copier being able to make communication with a copier of the another node through a copier-interface, and a processor which controls operation of the storage apparatus, wherein when the copier-interface is not troubled, the processor operates in a write-back mode in which the processor informs the host of completion of write-data storage when or after the copier has copied both write-data stored in the first memory and write-data stored in a first memory of another node into the second memory, and then, writes the write-data into the disc, whereas when the copier-interface is troubled, the processor operates in a write-through mode in which the processor writes the write-data stored in the first memory into the disc without copying the write-data into the second memory, and then, informs the host of completion of write-data storage.

In another aspect of the present invention, there is provided a method of controlling a storage apparatus including a plurality of nodes through which write-data received from a host is written into a disc, including copying, in each of the nodes, both write-data stored in a first memory and write-data stored in a first memory of another node into a second memory, judging whether a copier-interface through which each of the nodes can made communication with another node is troubled, and if the copier-interface is troubled, writing the write-data stored in the first memory into the disc without copying the write-data into the second memory.

The method may further include writing backup write-data stored in the second memory into the disc, when the copier-interface is troubled.

The method may further include diagnosing a copier used for copying both the write-data stored in the first memory and the write-data stored in a first memory of another node into the second memory, when each of the nodes restarts after the copier was exchanged into a new one.

The method may further include a fail-over controlling step in which, when another node stop operation thereof, each of the nodes takes over tasks to be carried out by the another node.

The method may further include making communication with another node when the copier-interface is troubled.

In still another aspect of the present invention, there is provided a program for causing a computer to carry out a method of controlling a storage apparatus including a plurality of nodes through which write-data received from a host is written into a disc, wherein steps executed by the computer in accordance with the program includes copying, in each of the nodes, both write-data stored in a first memory and write-data stored in a first memory of another node into a second memory, judging whether a copier-interface through which each of the nodes can made communication with another node is troubled, and if the copier-interface is troubled, writing the write-data stored in the first memory into the disc without copying the write-data into the second memory.

It is preferable that the steps further includes writing backup write-data stored in the second memory into the disc, when the copier-interface is troubled.

It is preferable that the steps further includes diagnosing a copier used for copying both the write-data stored in the first memory and the write-data stored in a first memory of another node into the second memory, when each of the nodes restarts after the copier was exchanged into a new one.

It is preferable that the steps further includes a fail-over controlling step in which, when another node stop operation thereof, each of the nodes takes over tasks to be carried out by the another node.

It is preferable that the steps further include making communication with another node when the copier-interface is troubled.

The advantages obtained by the aforementioned present invention will be described hereinbelow.

In accordance with the present invention, when a trouble is found in the copier-interface, write-data stored in the first memory is written directly into the disc without copying the write-data into the second memory. Thus, even if the copier-interface is troubled, it would be possible to keep the node in operation, avoiding reduction in the performance of the storage apparatus.

Furthermore, since the node is not stopped even if a trouble is found in the copier-interface, it would be possible to exchange the copier in a first node while the copier in a second node is kept in operation. That is, it is possible to carry out maintenance to the storage apparatus without stopping operation of the storage apparatus.

In accordance with the present invention, when a mode is switched into another mode, for instance, when a write-cache mode is switched into a write-through mode, backup data stored in the second memory is written into the disc. Hence, it is possible to surely reflect write-data received from a host into the disc.

In accordance with the present invention, the copier is diagnosed when a node restarts after the copier was exchanged into a new one. This ensures it possible to identify a node which is in trouble.

In accordance with the present invention, when another node stop operation thereof, each of nodes fails over the another node, that is, takes over tasks to be carried out by the another node. Thus, even when a copier in a certain node is troubled, it would be possible to exchange the troubled copier into a new one and incorporate the certain node including the new copier into the storage apparatus without stopping operation of the storage apparatus.

The above and other objects and advantageous features of the present invention will be made apparent from the following description made with reference to the accompanying drawings, in which like reference characters designate the same or similar parts throughout the drawings.

DESCRIPTION OF THE PREFERRED EMBODIMENTS

Preferred embodiments in accordance with the present invention will be explained hereinbelow with reference to drawings.

First Embodiment

Figure 1:
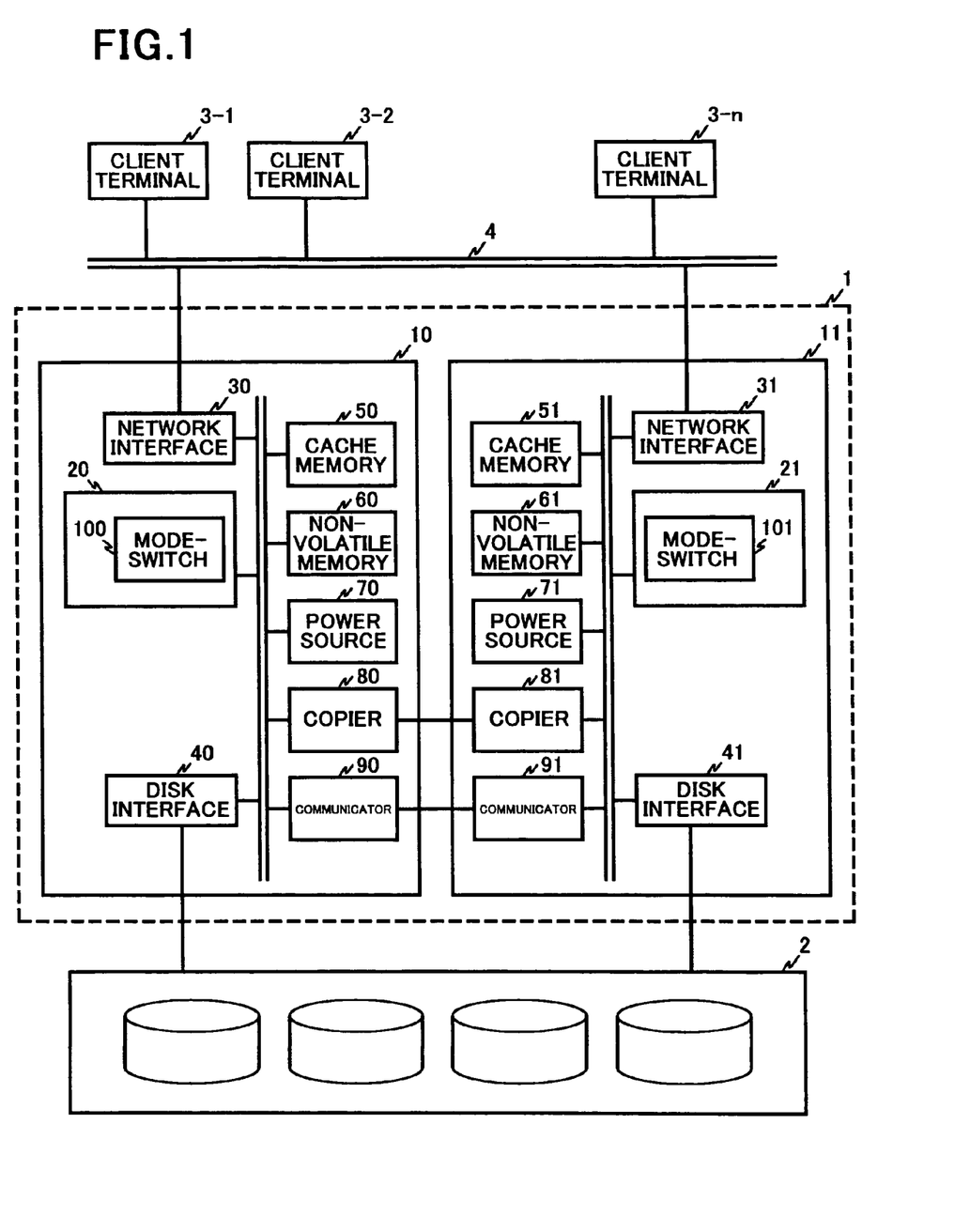
FIG. 1 is a block diagram of a storage apparatus in accordance with the first embodiment of the present invention.

FIG. 1 is a block diagram of a storage apparatus in accordance with the first embodiment of the present invention. The storage apparatus in accordance with the first embodiment is comprised of a network attached storage (NAS) apparatus 1.

As illustrated in FIG. 1, the NAS apparatus 1 is designed to include a first node 10 and a second node 11 each of which is electrically connected to a disc 2 in which a plurality of files is stored.

A plurality of client terminals 3-1 to 3-n each as a host can make access to the first and second nodes 10 and 11 through a network 4. Each of the first and second nodes 10 and 11 deals independently of each other with a request of reading/writing data received from the client terminals 3-1 to 3-n.

As is obvious in view of FIG. 1, parts having "0" at the trail in a reference number thereof belongs to the first node 10, and parts having "1" at the trail in a reference number thereof belongs to the second node 11.

The first node 10 is comprised of a processor 20 in which a NAS software is executed, a cache memory 50 temporarily storing read/write-data indicated by the client terminals 3-1 to 3-n, a network interface 30 through which data is transmitted to the cache memory 50 from the client terminals 3-1 to 3-n, and vice versa, a disc interface 40 through which read/write-data is transmitted to the cache memory 50 from the disc 2, and vice versa, a non-volatile memory 60, a power source 70 supplying electrical power to the non-volatile memory 60, a copier 80 which transfers data between the cache memory 50 and the non-volatile memory 60, and copies data stored in the cache memory 50 into a non-volatile memory 61 of the second node 11 through a copier-interface 5, and a communicator 90 through which communication is made between the first and second nodes 10 and 11 when the copier-interface 5 is troubled.

Write-data stored in the cache memory 50 is transmitted to the disc 2 through the disc interface 40, and read-data transmitted from the disc 2 is stored into the cache memory 40 through the disc interface 50.

The second node 11 has the same structure as that of the first node 10.

Specifically, the second node 11 is comprised of a processor 21 in which a NAS software is executed, a cache memory 51 temporarily storing read/write-data indicated by the client terminals 3-1 to 3-n, a network interface 31 through which data is transmitted to the cache memory 51 from the client terminals 3-1 to 3-n, and vice versa, a disc interface 41 through which read/write-data is transmitted to the cache memory 51 from the disc 2, and vice versa, a non-volatile memory 61, a power source 71 supplying electrical power to the non-volatile memory 61, a copier 81 which stores data stored in the cache memory 51 into the non-volatile memory 61, and data stored in the cache memory 50 of the first node 10 into the non-volatile memory 61 through the copier-interface 5, and a communicator 91 through which communication is made between the first and second nodes 10 and 11 when the copier-interface 5 is troubled.

Figure 2:
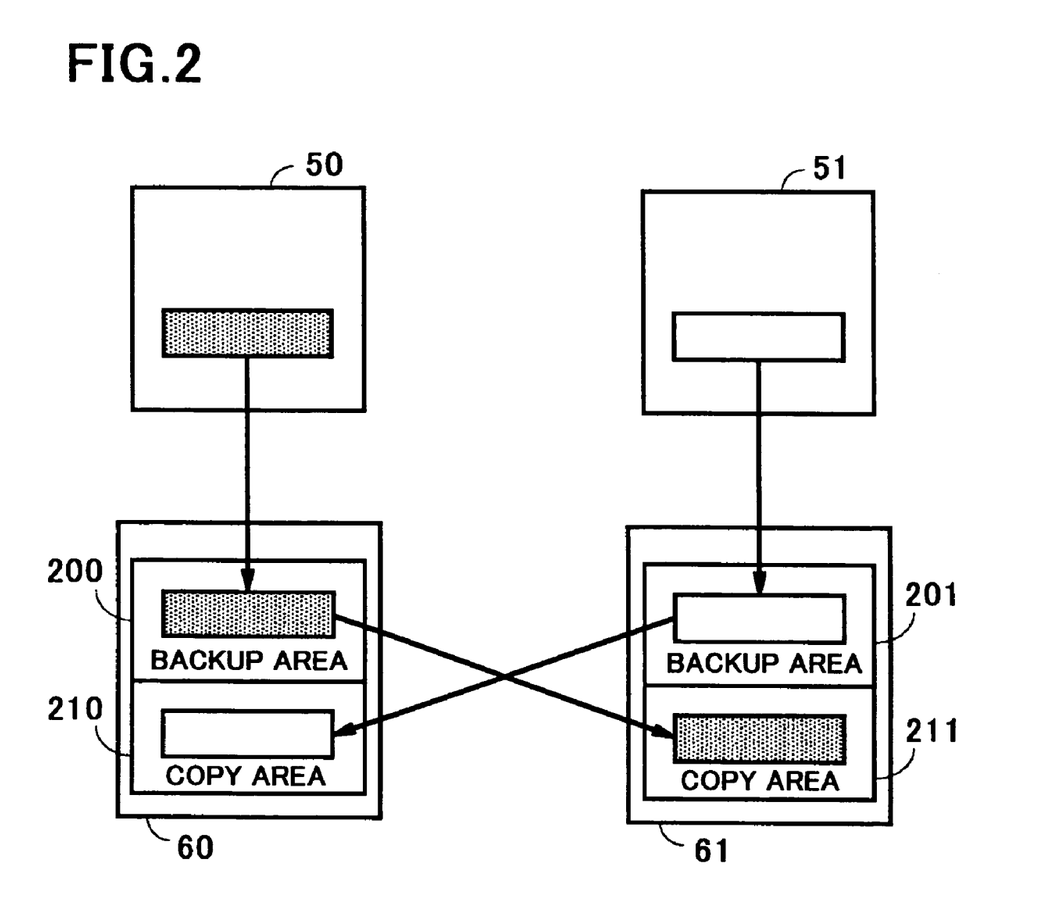
FIG. 2 illustrates imaginary areas of the non-volatile memories of the first and second nodes in the first embodiment.

FIG. 2 illustrates imaginary areas of the non-volatile memories 60 and 61 of the first and second nodes 10 and 11.

The non-volatile memory 60 of the first node 10 has a backup area 200 in which write-data stored in the cache memory 50 is stored as backup data, and a copy area 210 into which write-data stored in the cache memory 51 of the second node 11 is copied.

The non-volatile memory 61 of the second node 11 has a backup area 201 in which write-data stored in the cache memory 51 is stored as backup data, and a copy area 211 into which write-data stored in the cache memory 50 of the first node 10 is copied.

On receipt of a request of writing data into the disc 2, from any one of the client terminals 3-1 to 3-n (for instance, the client terminal 3-1), the network interface 30 of the first node 10 further receives write-data from the client terminal 3-1, and then, stores the received write-data into the cache memory 50.

The processor 20 writes the write-data stored in the cache memory 50 into the backup area 200 of the non-volatile memory 60, and then, makes communication with the second node 11 through the copier 80 and the copier-interface 5 to copy the write-data stored in the non-volatile memory 60, into the copy area 211 of the non-volatile memory 61 of the second node 11. Then, the processor 20 informs the client terminal 3-1 of completion of writing the write-data into the disc 2.

Thereafter, the processor 20 writes the write-data into the disc 2 through the disc interface 40. Then, the processor 20 deletes the write-data out of the backup area 200 of the non-volatile memory 60 and the cop area 211 of the non-volatile memory 61.

The processor 20 writes the write-data stored in the cache memory 50 into the disc 2 while the processor 20 is free of tasks. The above-mentioned write-back action of the first node 10 accomplishes early response to the client terminal 3-1.

In the first embodiment, as illustrated in FIG. 1, the processor 20 of the first node 10 is designed to include a mode-switch 100.

The mode-switch 100 separates the copier 80 from the step of writing the write-data into the disc 2, when the copier 80 is troubled.

Specifically, when the copier 80 is troubled, the processor 20 of the first node 10 stops the write-data stored in the cache memory 50 from being written into the non-volatile memory 60 as backup data, and makes communication with the second node 11 through the communicator 90 in place of the copier 80 to stop the write-data stored in the cache memory 50 from being copied into the copy area 211 of the non-volatile memory 61 of the second node 11.

Then, the mode-switch 100 operates the first node 10 in a write-through mode. Specifically, the mode-switch 100, writes the write-data stored in the cache memory 50 directly into the disc 2 without copying the write-data into the non-volatile memory 60.

The processor 21 of the second node 11 is designed to have a mode-switch 101 having the same functions as those of the mode-switch 100 of the processor 20 in the first node 10.

Figure 3:
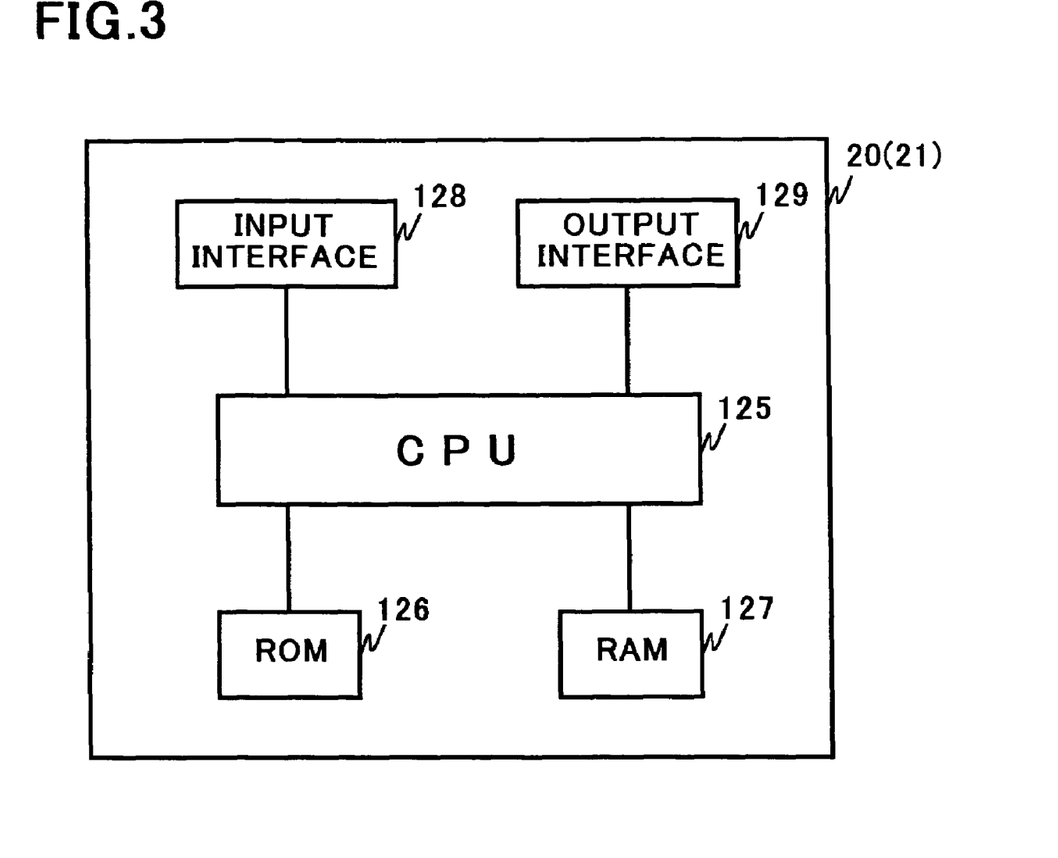
FIG. 3 is a block diagram of an example of each of the processors of the first and second nodes in the first embodiment.

FIG. 3 is a block diagram of an example of each of the processors 20 and 21 of the first and second nodes 10 and 11.

As illustrated in FIG. 3, each of processors 20 and 21 is comprised of a central processing unit (CPU) 125, a first memory 126, a second memory 127, an input interface 128 through which a command and/or data is input into the central processing unit 125, and an output interface 129 through which a result of steps having been executed by the central processing unit 125 is output.

Each of the first and second memories 126 and 127 is comprised of a semiconductor memory such as a read only memory (ROM), a random access memory (RAM) or an IC memory card, or a storage device such as a flexible disc, a hard disc or an optic magnetic disc.

In the first embodiment, the first memory 126 comprises a read only memory (ROM), and the second memory 127 comprises a random access memory (RAM).

The first memory 126 stores therein a program for causing a computer to carry out a method of controlling the NAS apparatus 1. The second memory 127 stores therein various data and parameters, and presents a working area to the central processing unit 125. The central processing unit 125 reads the program out of the first memory 126, and executes the program. Thus, the central processing unit 125 operates in accordance with the program stored in the first memory 126.

In the first embodiment, the cache memory 50 and the non-volatile memory 60 may be used in place of the first and second memories 126 and 127.

Figure 4:
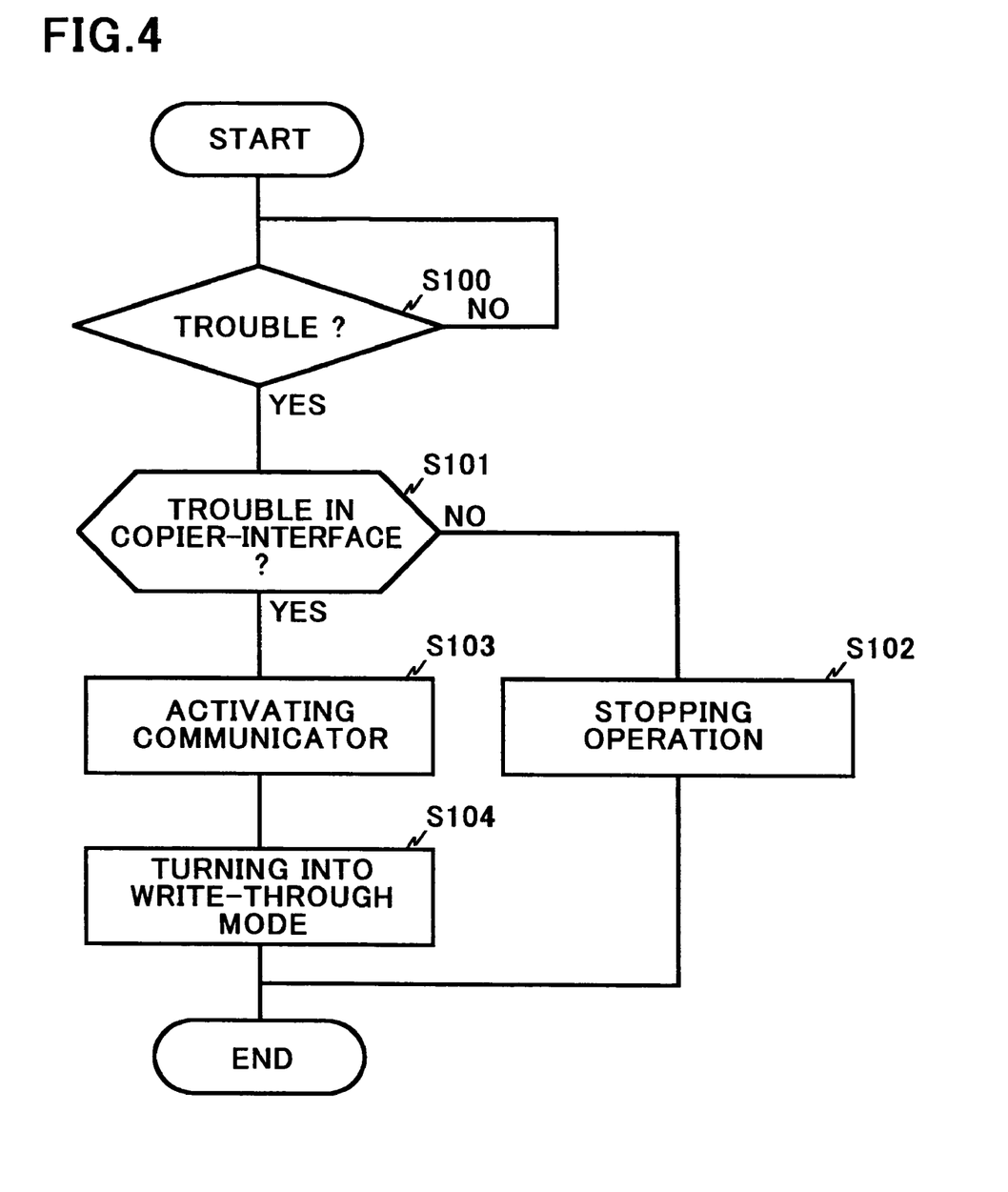
FIG. 4 is a flow chart showing steps to be carried out in the operation of the storage apparatus in accordance with the first embodiment.

FIG. 4 is a flow chart showing steps to be carried out in the operation of the NAS apparatus 1.

First, the processor 20 of the first node 10 checks whether there is a trouble in the parts constituting the processor 20, in step S100.

If the processor 20 cannot find any trouble in the parts constituting the processor 20 (NO in step S100), the processor 20 keep checking whether there is a trouble in the parts constituting the processor 20, until any trouble is found.

If the processor 20 finds a trouble in the parts constituting the processor 20 (YES in step S100), the processor 20 further checks whether the trouble occurs in the copier-interface 5, in step S101.

If the trouble occurs in the parts other than the copier-interface 5, that is, if the trouble occurs in any one of the processor 20, the network interface 30, the disc interface 40, the cache memory 50, the non-volatile memory 60, the copier 80 and the communicator 90 (NO in step S101), the processor 20 stops operating, in step S102.

If the trouble occurs in the copier-interface 5 (YES in step S101), the processor 20 instructs the mode-switch 100 to separate the copier 80 from the action of writing write-data into the disc 2. Specifically, the mode-switch 100 inactivates the copier 80 and activates the communicator 90 to thereby instruct the mode-switch 101 of the processor 21 in the second node 11 to inactivate the copier 80 through the communicators 90 and 91, in step S103. Hereinafter, the first and second nodes 10 and 11 make communication with each other through the communicators 90 and 91 in place of the copiers 80 and 81. That is, the first and second nodes 10 and 11 make synchronization with each other with respect to the communication therebetween.

Then, the mode-switch 100 inactivates the copier 80, and turns an action mode of the first node 10 into a write-through mode from a write-cache mode, in step S104. Hereinafter, the first node 10 deals with requests received from the client terminals 3-1 to 3-n in the write-through mode.

In the write-cache mode, the processor 20 copies the write-data stored in the cache memory 50 into both the backup area 200 of the non-volatile memory 60 and the copy-area 211 of the non-volatile memory 61. Then, the processor 20 informs the client terminal of completion of writing write-data into the disc 2.

In contrast, in the write-through mode, the processor 20 writes the write-data stored in the cache memory 50 into the disc 2 without copying the write-data into the non-volatile memories 60 and 61. Then, the processor 20 informs the client terminal of completion of writing write-data into the disc 2. The write-data which is being stored into the non-volatile memory 60 and which is not informed of the client terminal, and the write-data having been copied from the cache memory 51 of the second node 11 are both erased from the non-volatile memory 60.

The mode-switch 101 of the second node 11 operates in the same way as the mode-switch 100 of the first node 10. On receipt of the instruction from the first node 10, the mode-switch 101 turns an action mode of the second node 11 to a write-through mode from a write-cache mode. The write-data which is being stored into the non-volatile memory 61 and which is not informed of the client terminal, and the write-data having been copied from the cache memory 50 of the first node 10 are both erased from the non-volatile memory 61.

Second Embodiment

Figure 5:
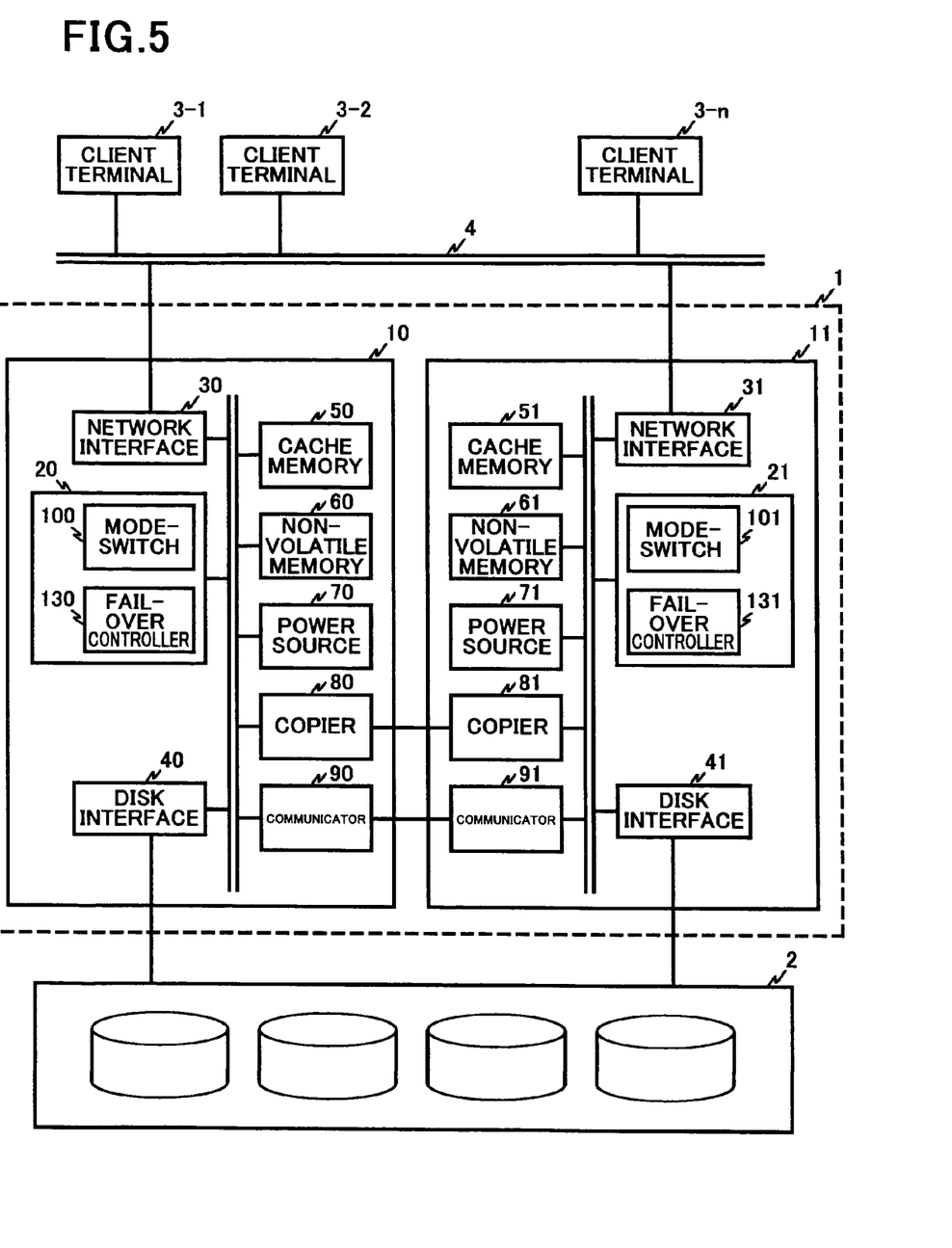
FIG. 5 is a block diagram of a storage apparatus in accordance with the second embodiment of the present invention.

FIG. 5 is a block diagram of a storage apparatus in accordance with the second embodiment of the present invention. The storage apparatus in accordance with the second embodiment is comprised of a network attached storage (NAS) apparatus 1, similarly to the first embodiment.

The storage apparatus in accordance with the second embodiment additionally includes fail-over controllers 130 and 131 in the processors 20 and 21, respectively, in comparison with the storage apparatus in accordance with the first embodiment.

Parts or elements that correspond to those of the storage apparatus in accordance with the first embodiment, illustrated in FIG. 1, have been provided with the same reference numerals, and operate in the same manner as corresponding parts or elements in the first embodiment, unless explicitly explained hereinbelow.

For instance, if the second node 11 recognizes that the first node 10 stops operation, by communication made between the copiers 80 and 81, the second node 11 fails over the first node 10. That is, the second node 11 takes over tasks to be carried out by the first node 10.

The processor 21 of the second node 11, when a trouble was found in the first node 10, writes the write-data stored in the copy-area 211 of the non-volatile memory 61 into the disc 2 through the disc interface 41. Thereafter, the processor 21 of the second node 11 deals with requests transmitted to the first node 10 from the client terminals 3-1 to 3-n.

Third Embodiment

Figure 6:
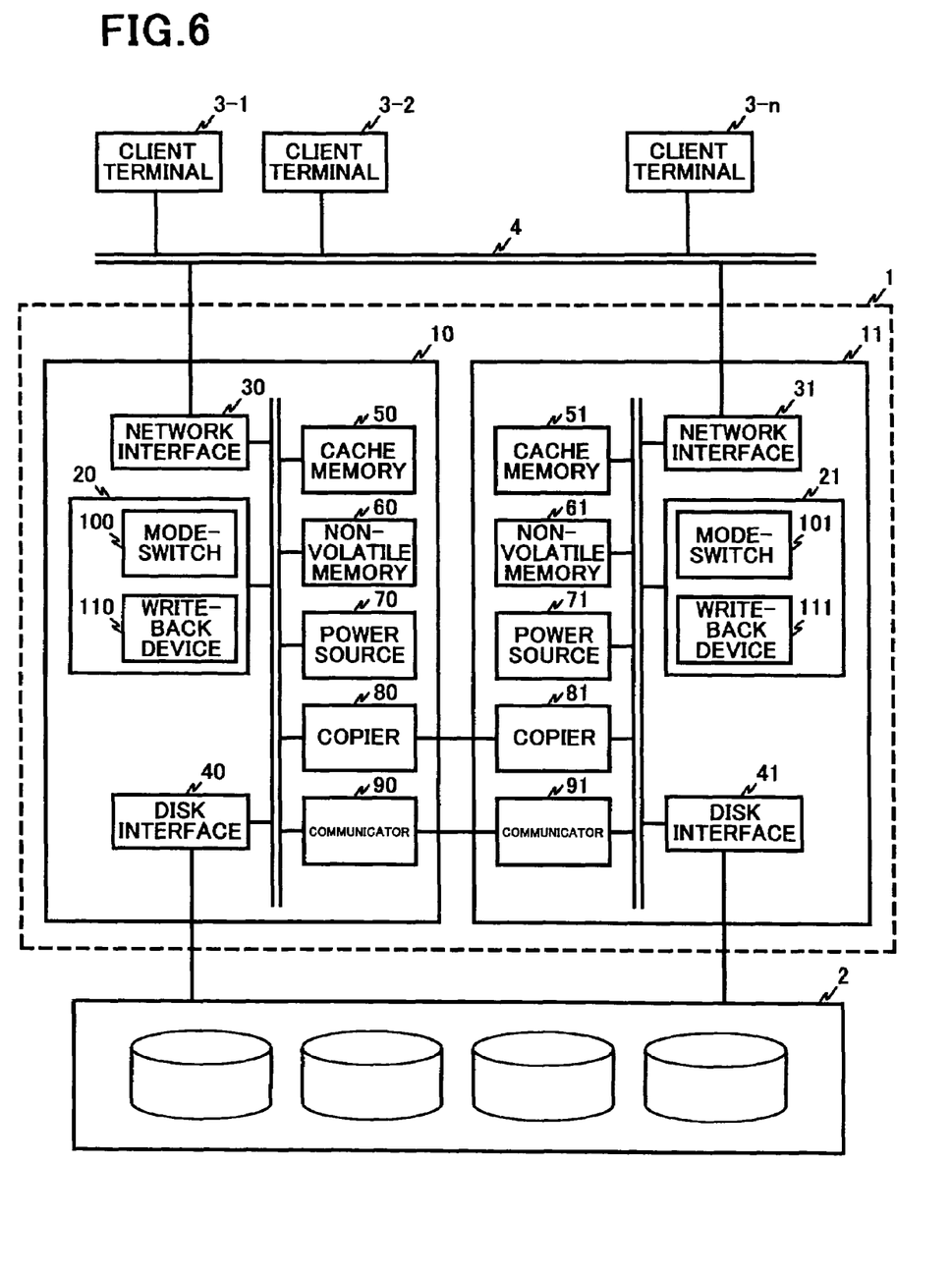
FIG. 6 is a block diagram of a storage apparatus in accordance with the third embodiment of the present invention.

FIG. 6 is a block diagram of a storage apparatus in accordance with the third embodiment of the present invention. The storage apparatus in accordance with the third embodiment is comprised of a network attached storage (NAS) apparatus 1, similarly to the first and second embodiments.

The storage apparatus in accordance with the third embodiment additionally includes write-back devices 110 and 111 in the processors 20 and 21, respectively, in comparison with the storage apparatus in accordance with the first embodiment.

Parts or elements that correspond to those of the storage apparatus in accordance with the first embodiment, illustrated in FIG. 1, have been provided with the same reference numerals, and operate in the same manner as corresponding parts or elements in the first embodiment, unless explicitly explained hereinbelow.

For instance, the write-back device 110 writes the write-data stored in the non-volatile memory 60 into the disc 2 when the copier 80 is inactivated.

Figure 7:
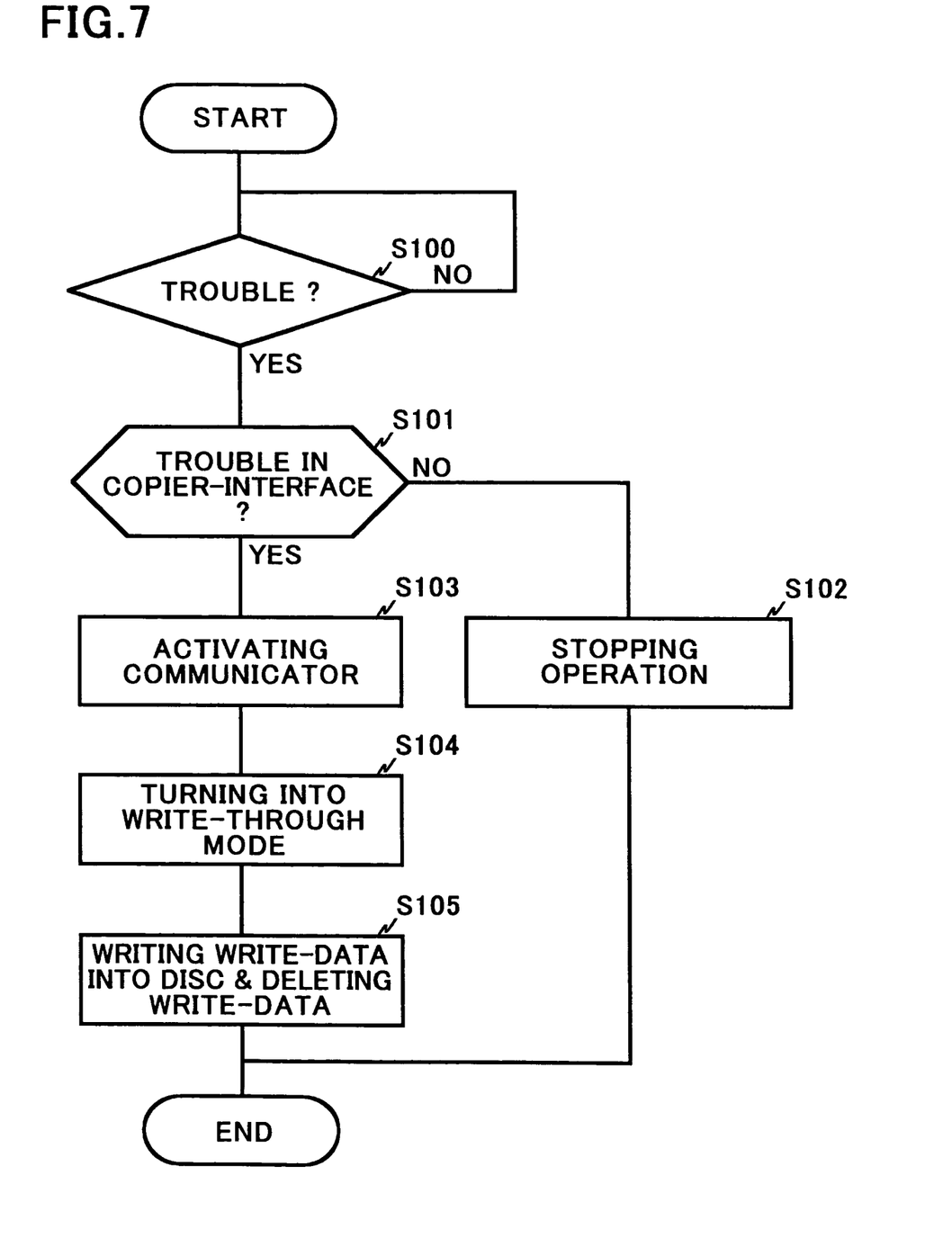
FIG. 7 is a flow chart showing steps to be carried out in the operation of the storage apparatus in accordance with the third embodiment.

FIG. 7 is a flow chart showing steps to be carried out in the operation of the storage apparatus in accordance with the third embodiment.

The steps S100 to S104 are carried out in the same as the above-mentioned first embodiment (see FIG. 4).

After the first node 10 was turned into a write-through mode (step S104), the mode-switch 100 instructs the write-back device 110 to write the write-data stored in the non-volatile memory 60 as backup data, into the disc 2.

On receipt of the instruction from the mode-switch 100, the write-back device 110 reads the write-data out of the backup area 200 of the non-volatile memory 60, and then, writes the write-data into the disc 2. The write-back device 110 deletes the write-data having been written into the disc 2, from the backup area 200 of the non-volatile memory 60, in step S105.

When the write-back device 110 has finished writing the write-data stored in the backup area 200 of the non-volatile memory 60, into the disc 2, the write-back device 110 informs the mode-switch 100 of completion of writing the write-data into the disc 2.

The write-back device 111 in the second node 11 operates in the same way as the write-back device 110 in the first node 10.

On receipt of the instruction from the mode-switch 101, the write-back device 111 reads the write-data out of the backup area 201 of the non-volatile memory 61, and then, writes the write-data into the disc 2. The write-back device 111 deletes the write-data having been written into the disc 2, from the backup area 201 of the non-volatile memory 61.

When the write-back device 111 has finished writing the write-data stored in the backup area 201 of the non-volatile memory 61, into the disc 2, the write-back device 111 informs the mode-switch 101 of completion of writing the write-data into the disc 2.

If the mode-switch 100 receives a fail-over instruction from an operator in order to exchange the copier 80 into a new one, the mode-switch 100 checks whether the write-back device 110 has finished writing the write-data into the disc 2, that is, whether informed of completion of writing the write-data into the disc 2 from the write-back device 110.

If not, the mode-switch 100 does not carry out any action until informed of completion of writing the write-data into the disc 2 from the write-back device 110.

If the write-back device 110 has finished writing the write-data into the disc 2, the first node 10 informs the second node 11 through the communicator 90 that the second node 11 can fail over the first node 10. Then, the second node 11 takes over the tasks to be carried out by the first node 10.

Fourth Embodiment

Figure 8:
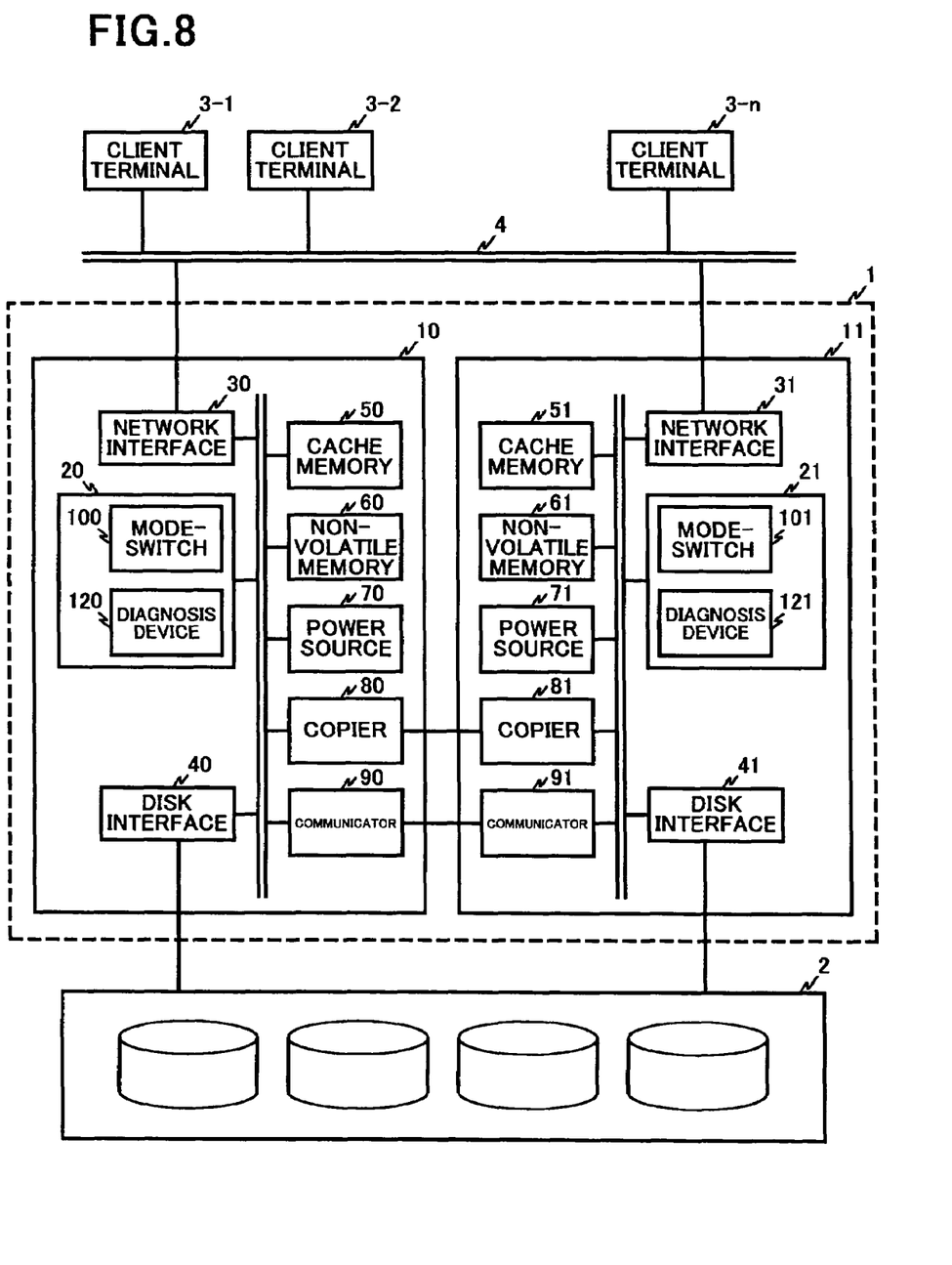
FIG. 8 is a block diagram of a storage apparatus in accordance with the fourth embodiment of the present invention.

FIG. 8 is a block diagram of a storage apparatus in accordance with the fourth embodiment of the present invention. The storage apparatus in accordance with the fourth embodiment is comprised of a network attached storage (NAS) apparatus 1, similarly to the first to third embodiments.

The storage apparatus in accordance with the fourth embodiment additionally includes diagnosis devices 120 and 121 in the processors 20 and 21, respectively, in comparison with the storage apparatus in accordance with the first embodiment.

Parts or elements that correspond to those of the storage apparatus in accordance with the first embodiment, illustrated in FIG. 1, have been provided with the same reference numerals, and operate in the same manner as corresponding parts or elements in the first embodiment, unless explicitly explained hereinbelow.

For instance, the diagnosis device 120 diagnoses a new copier 80 when the first node 10 restarts, after the troubled copier 80 was exchanged into the new one.

Figure 9:
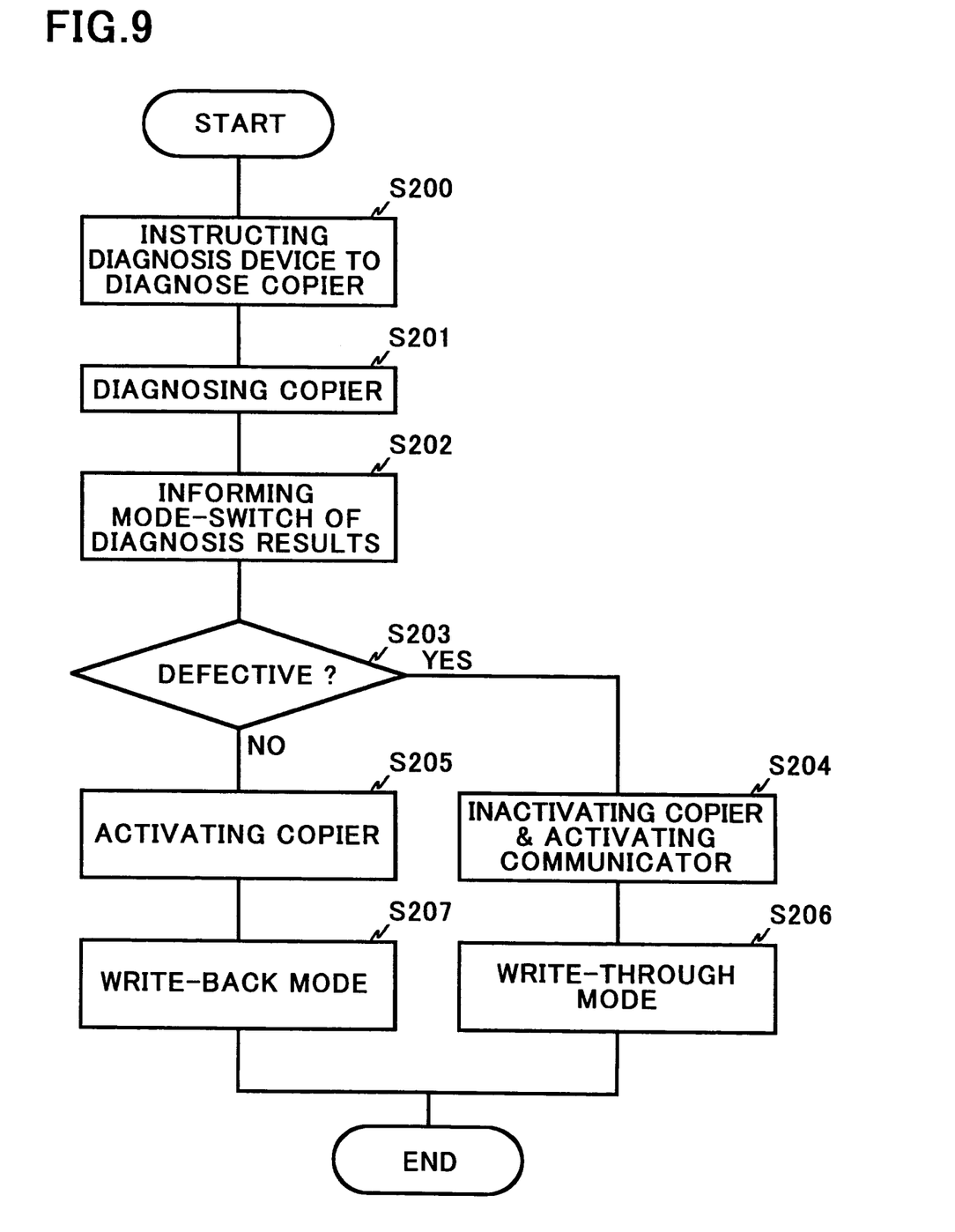
FIG. 9 is a flow chart showing steps to be carried out in the operation of the storage apparatus in accordance with the fourth embodiment when the copier is exchanged into a new one and the first node restarts.

FIG. 9 is a flow chart showing steps to be carried out in the operation of the storage apparatus in accordance with the fourth embodiment when the copier 80 is exchanged into a new one and the first node 10 restarts.

When the first node 10 is caused to restart, the mode-switch 100 makes communication with the mode-switch 101 of the second node 11 through the communicator 90, and instructs the diagnosis device 120 to diagnose the copiers 80 and 81, in step S200.

The diagnosis device 120 diagnoses the copier 80, and receives the result of diagnosis conducted to the copier 81 by the diagnosis device 121, in step S201.

Then, the diagnosis device 120 informs the mode-switch 100 of the diagnosis results of the copiers 80 and 81, in step S202.

The diagnosis conducted by the diagnosis device 120 is explained hereinbelow.

In the diagnosis of the copier 80 conducted by the diagnosis device 120, the diagnosis device 120 transfers the diagnosis data stored in the non-volatile memory 60, to a buffer of the copier 80, and further, transfers the diagnosis data stored in a buffer of the copier 80, to the non-volatile memory 60. Then, the diagnosis device 120 compares the diagnosis data stored in the non-volatile memory 60 to the diagnosis data stored in a buffer of the copier 80 to check whether the diagnosis data is accurately transferred to each other.

When the copier 81 is to be diagnosed, the diagnosis device 120 instructs the diagnosis device 121 to diagnose the copier 81 through the copier-interface 5 or the communicator 90, and then, transfers the diagnosis data stored in a buffer of the copier 80 to a buffer of the copier 81.

The diagnosis device 121 transfers the diagnosis data stored in a buffer of the copier 81 to a buffer of the copier 80.

The diagnosis device 120 compares the diagnosis data received from the second node 11 to the diagnosis data stored in a buffer of the copier 80.

Then, the diagnosis device 120 transmits a call-back instruction to the diagnosis device 121. On receipt of the instruction, the diagnosis device 121 transfers the diagnosis data stored in a buffer of the copier 81 to a buffer of the copier 80.

The diagnosis device 120 transfers the diagnosis data stored in a buffer of the copier 80 to a buffer of the copier 81 again.

The diagnosis device 121 compares the diagnosis data received from the first node 10 to the diagnosis data stored in a buffer of the copier 81, and transmits the diagnosis result to the diagnosis device 120.

The diagnosis of the copiers 80 and 81 is conducted between the first and second nodes 10 and 11 in the above-mentioned way.

On receipt of the diagnosis result from the diagnosis device 120, the mode-switch 100 judges whether the copier 80 is defective, based on the received diagnosis result, in step S203.

If the mode-switch 100 judges the copier 80 defective (YES in step S203), the mode-switch 100 inactivates the copier 80, and activates the communicator 90, in step S204. Then, the mode-switch 100 informs the mode-switch 101 of the second node 11 that the copier 80 is judged defective, through the communicator 90.

If the mode-switch 100-judges the copier 80 not defective (NO in step S203), the mode-switch 100 informs the mode-switch 101 of the second node 11 that the copier 80 is judged not defective, through the communicator 90, and activates the copier 80, in step S205.

The first node 10 fails over the second node 11. That is, the first node 10 takes over tasks which were previously took over by the second node 12.

If the copier 80 is defective, and hence, is inactivated, the processor 20 of the first node 10 deals with the write-data in a write-through mode, in step S206.

In contrast, if the copier 80 is not defective, and hence, is activated, the processor 20 of the first node 10 deals with the write-data in a write-back mode, in step S207.

Being notified from the first node 10, the mode-switch 101 of the second node 11 operates as follows.

If the mode-switch 101 of the second node 11 is informed that the copier 80 is defective, the processor 21 of the second node 11 inactivates the copier 81, and deals with the write-data in a write-through mode.

If the mode-switch 101 of the second node 11 is informed that the copier 80 is not defective, the processor 21 of the second node 11 activates the copier 81, and deals with the write-data in a write-back mode.

If the first node 10 inappropriately operates after the copier 80 was exchanged into a new one, it can be judged that the copier 81 of the second node 11 is defective. Hence, an operator may exchange the copier 81 into a new one, in which case, the operator gives a fail-over instruction to the second node 11 in order to exchange the copier 81 into a new one. The mode-switch 101 of the second node 11 informs the first node 10 that the copier 81 of the second node 11 is defective, after the write-data was written into the disc 2. Then, the first node 10 fails over the second node 11.

Thereafter, the second node 11 stops operation thereof. Then, the copier 81 is exchanged into a new one. Then, the second node 11 restarts.

The mode-switch 101 instructs the diagnosis device 121 to diagnose the copier 81. The diagnosis device 121 diagnoses the copier 81, and transmits the diagnosis results to the first node 10 through the communicators 91 and 90.

If the copier 81 is judged not defective, the mode-switch 101 activates the copier 81, and resets the non-volatile memory 61. Then, the mode-switch 101 puts the second node 11 into a write-back mode.

In accordance with the above-mentioned first to fourth embodiments, even if the copier-interface 5 is troubled, it would be possible to exchange the copier 80 or 81 into a new one without stopping operation of the storage apparatus. This ensures improvement in maintenance of the storage apparatus.

The storage apparatus in accordance with the present invention is applicable to a network attached storage (NAS) apparatus or a disc array apparatus which includes a plurality of nodes each having a cache memory and a non-volatile memory, and a copier by which write-data stored in the cache memory is transferred to the non-volatile memory of the other node.

The storage apparatuses in accordance with the above-mentioned first to fourth embodiments are designed to include two nodes, that is, the first and second nodes 10 and 11. However, it should be noted that the storage apparatus in accordance with the present invention may be designed to include three or more nodes, in which case, a main node may be designed to be able to make communication with other nodes through a copier-interface, or all nodes may be designed to be able to make communication with one another through copier-interfaces.

The storage apparatuses in accordance with the above-mentioned first to fourth embodiments are designed to include the cache memories 50 and 51 and the non-volatile memories 60 and 61. However, it should be noted that the storage apparatus in accordance with the present invention may be designed to include other memories in place of the cache memories 50 and 51 and the non-volatile memories 60 and 61.

While the present invention has been described in connection with certain preferred embodiments, it is to be understood that the subject matter encompassed by way of the present invention is not to be limited to those specific embodiments. On the contrary, it is intended for the subject matter of the invention to include all alternatives, modifications and equivalents as can be included within the spirit and scope of the following claims.

The entire disclosure of Japanese Patent Application No. 2005-094031 filed on Mar. 29, 2005 including specification, claims, drawings and summary is incorporated herein by reference in its entirety.

What is claimed is:

1. A storage apparatus comprising a plurality of nodes through which write-data received from a host is written into a disc, wherein each of said nodes including:

a first memory in which said write-data is temporarily stored;

a second memory;

a copier which copies both write-data stored in said first memory and write-data stored in a first memory of another node, into same said second memory, said copier being able to make communication with a copier of said another node through a copier-interface; and a mode-switch which, when a trouble is found in said copier-interface, writes said write-data stored in said first memory into said disc without copying said write-data into said second memory.

2. The storage apparatus as set forth in claim 1, wherein each of said nodes further includes a write-back device which, when said mode-switch switches a mode into another mode, writes said write-data stored in said second memory into said disc.

3. The storage apparatus as set forth in claim 1, wherein each of said nodes further includes a diagnosis device which diagnoses said copier when said node restarts after said copier was exchanged into a new one.

4. The storage apparatus as set forth in claim 1, wherein each of said nodes further includes a fail-over controller which, when another node stop operation thereof, takes over tasks to be carried out by said another node.

5. The storage apparatus as set forth in claim 1, wherein each of said nodes further includes a communicator which makes communication with another node when said copier-interface is troubled.

6. The storage apparatus as set forth in claim 1, wherein said first memory comprises a cache memory.

7. The storage apparatus as set forth in claim 1, wherein said second memory comprises a non-volatile memory.

8. The storage apparatus as set forth in claim 1, wherein a number of said nodes is two.

9. A storage apparatus comprising a plurality of nodes through which write-data received from a host is written into a disc, wherein each of said nodes including:
a first memory in which said write-data is temporarily stored;
a second memory as a backup memory for storing said write-data;
a copier which copies both write-data stored in said first memory and write-data stored in a first memory of another node, into same said second memory, said copier being able to make communication with a copier of said another node through a copier-interface; and
a processor which controls operation of said storage apparatus,
wherein when said copier-interface is not troubled, said processor operates in a write-back mode in which said processor informs said host of completion of write-data storage when or after said copier has copied both write-data stored in said first memory and write-data stored in a first memory of another node into said second memory, and then, writes said write-data into said disc,
whereas when said copier-interface is troubled, said processor operates in a write-through mode in which said processor writes said write-data stored in said first memory into said disc without copying said write-data into said second memory, and then, informs said host of completion of write-data storage.

10. The storage apparatus as set forth in claim 9, wherein each of said nodes further includes a diagnosis device which diagnoses said copier when said node restarts after said copier was exchanged into a new one.

11. The storage apparatus as set forth in claim 9, wherein each of said nodes further includes a fail-over controller which, when another node stop operation thereof, takes over tasks to be carried out by said another node.

12. The storage apparatus as set forth in claim 9, wherein each of said nodes further includes a communicator which makes communication with another node when said copier-interface is troubled.

13. The storage apparatus as set forth in claim 9, wherein said first memory comprises a cache memory.

14. The storage apparatus as set forth in claim 9, wherein said second memory comprises a non-volatile memory.

15. The storage apparatus as set forth in claim 9, wherein a number of said nodes is two.

16. A method of controlling a storage apparatus comprising a plurality of nodes through which write-data received from a host is written into a disc, comprising:
copying, in each of said nodes, both write-data stored in a first memory and write-data stored in a first memory of another node into same second memory;
judging whether a copier-interface through which each of said nodes can make communication with another node is judged as troubled; and
if said copier-interface is troubled, writing said write-data stored in said first memory into said disc without copying said write-data into said second memory.

17. The method as set forth in claim 16, further including writing backup write-data stored in said second memory into said disc, when said copier-interface is judged as troubled.

18. The method as set forth in claim 16, further including diagnosing a copier used for copying both said write-data stored in said first memory and said write-data stored in a first memory of another node into said second memory, when each of said nodes restarts after said copier was exchanged into a new one.

19. The method as set forth in claim 16, further including a fail-over controlling in which, when another node stop operation thereof, each of said nodes takes over tasks to be carried out by said another node.

20. The method as set forth in claim 16, further including making communication with another node when said copier-interface is judged as troubled.

21. A computer-readable medium encoded with a computer program for causing a computer to carry out a method of controlling a storage apparatus comprising a plurality of nodes through which write-data received from a host is written into a disc, wherein execution by said computer in accordance with said computer-readable medium encoded with a computer program includes:
copying, in each of said nodes, both write-data stored in a first memory and write-data stored in a first memory of another node into same second memory;
judging whether a copier-interface through which each of said plurality of nodes can make communication with another node is troubled; and
if said copier-interface is judged as troubled, writing said write-data stored in said first memory into said disc without copying said write-data into said second memory.

22. The computer-readable medium encoded with a computer program as set forth in claim 21, wherein said execution further includes writing backup write-data stored in said second memory into said disc, when said copier-interface is judged as troubled.

23. The computer-readable medium encoded with a computer program as set forth in claim 21, wherein said execution further includes diagnosing a copier used for copying both said write-data stored in said first memory and said write-data stored in a first memory of another node into said second memory, when each of said nodes restarts after said copier was exchanged into a new one.

24. The computer-readable medium encoded with a computer program as set forth in claim 21, wherein said execution further includes a fail-over controlling in which, when another node stop operation thereof, each of said nodes takes over tasks to be carried out by said another node.

25. The computer-readable medium encoded with a computer program as set forth in claim 21, wherein said execution further includes making communication with another node when said copier-interface is judged as troubled.

* * * * *